US008798818B2

(12) United States Patent
Wiesemann et al.

(10) Patent No.: US 8,798,818 B2
(45) Date of Patent: Aug. 5, 2014

(54) METHOD AND SYSTEM FOR DYNAMICALLY DETERMINING AND DISPLAYING NAVIGATION INFORMATION (75) Inventors: Thorsten Wiesemann, Hessen (DE); Patrick R. Wipplinger, Moerfelden-Walldorf (DE); Theodore B. Thompson, Highlands Ranch, CO (US)

(73) Assignee: The Boeing Company, Chicago, IL (US)

( * ) Notice: Subject to any disclaimer, the term of this patent is extended or adjusted under 35 U.S.C. 154(b) by 799 days.

(21) Appl. No.: 11/868,812

(22) Filed: Oct. 8, 2007

(65) Prior Publication Data
US 2009/0093953 A1 Apr. 9, 2009

(51) Int. Cl.
G06F 19/00 (2011.01)
G06G 7/70 (2006.01)
G01C 23/00 (2006.01)
G05D 1/00 (2006.01)
G05D 3/00 (2006.01)
G06F 7/00 (2006.01)
G06F 17/00 (2006.01)

(52) U.S. Cl.
USPC .................................. 701/16; 701/3

(58) Field of Classification Search
USPC ...................... 701/3, 200, 16, 400
See application file for complete search history.

(56) References Cited

U.S. PATENT DOCUMENTS 5,978,715 A * 11/1999 Briffe et al. ............... 701/11
6,119,055 A * 9/2000 Richman ................... 701/16
6,438,469 B1 * 8/2002 Dwyer et al. .............. 701/16
6,456,940 B1 * 9/2002 Higgins .................... 701/301
6,710,723 B2 * 3/2004 Muller et al. .............. 340/970
6,879,886 B2 4/2005 Wilkins, Jr. et al.
7,089,092 B1 * 8/2006 Wood et al. ................ 701/14
7,516,011 B1 * 4/2009 Kabel et al. ............... 701/415
7,876,238 B2 1/2011 Vandebergh
2002/0039070 A1 4/2002 Ververs et al.
2004/0183695 A1 * 9/2004 Ruokangas et al. ....... 340/945
2004/0246178 A1 * 12/2004 Smith ...................... 342/454
2006/0227014 A1 * 10/2006 Gannon .................... 340/972
2006/0259232 A1 * 11/2006 Huthoefer et al. ......... 701/120
2007/0129857 A1 6/2007 Fortier
2008/0103645 A1 * 5/2008 DeMers et al. ............ 701/14
2008/0164411 A1 * 7/2008 Kerr ........................ 250/330

FOREIGN PATENT DOCUMENTS

EP 1852683 11/2007

OTHER PUBLICATIONS

European Search Report for corresponding European Patent Application No. 08 253 2292 dated Jan. 2, 2013, 6 pages.

* cited by examiner

*Primary Examiner* — Imran Mustafa (57) ABSTRACT

A method and system for dynamically evaluating a quantity of context sensitive information used by an operator of an airborne mobile platform in performing an operational procedure involving said mobile platform, and determining, in real time, a sub-quantity of context sensitive information that pertains to only that sub-quantity of information required by said operator to execute said operational procedure. The sub-quantity of information is then displayed on a display in real time for the operator. The method and system significantly eases the cognitive workload of the operator by enabling the operator to focus on and digest only that sub-quantity of information that is pertinent to performing the operational procedure with the specific type of mobile platform being operated. In one embodiment the sub-quantity of information pertains to minima information for performing an aircraft landing approach operation.

15 Claims, 4 Drawing Sheets

METHOD AND SYSTEM FOR DYNAMICALLY DETERMINING AND DISPLAYING NAVIGATION INFORMATION

FIELD

The present disclosure relates to information management systems and methods, and particularly to a method and system for dynamically evaluating a quantity of context sensitive information available to be displayed to an aircraft pilot and determining a minimum subset of relevant information to be provided to the pilot to enable the pilot to more easily digest the information while operating the aircraft.

BACKGROUND

Statements in this section merely provide background information related to the present disclosure and may not constitute prior art.

Figure 1:
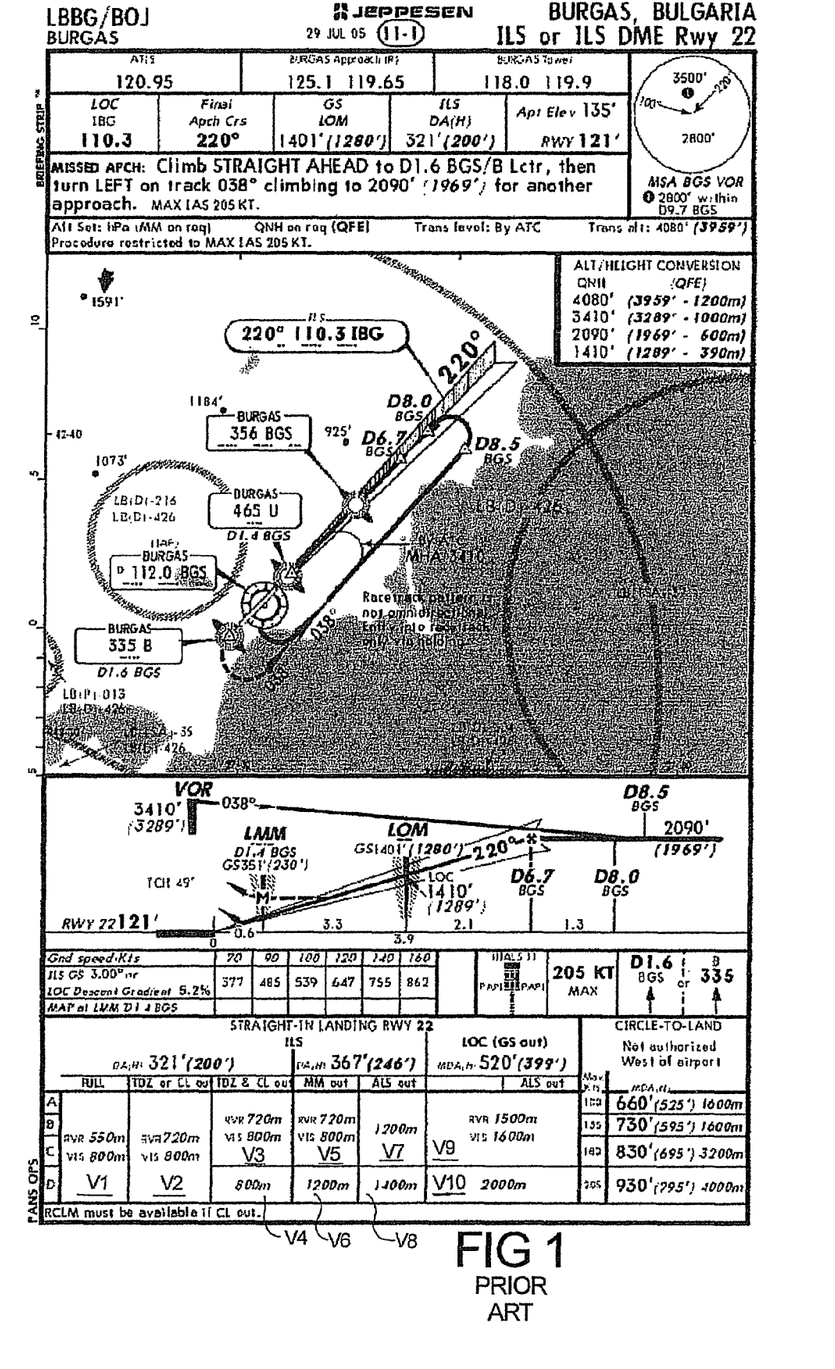
FIG. 1 is a prior art illustration of an aircraft approach chart for Basle/Mulhouse Airport, France (LFSB/MLH)

Current landing approach information for aeronautical applications is typically depicted on a cockpit display or paper charts to a pilot and/or co-pilot as pre-composed and non-interactive images. Such images typically contain all approach minima related information which are applicable to a specific approach procedure, covering any applicable aircraft categories, any approach landing maneuvers, various missed approach climb gradients, and several component-out conditions of the airport facilities. One exemplary minima chart for "LFSB" (Basle/Mulhouse Airport, France) is illustrated in FIG. 1. Five different RVR (Runway Visual Range) requirements are presented to the pilot for evaluation, together with 10 different visibility figures V1-V10. Two of the RVRs are for ILS (Instrument Landing System) with and without ALS (Approach Lighting System) and two for LOC (Localizer) with and without ALS. In addition, other critical information such as the Decision Height (DH) or Minimum Descent Altitude (MDA) are also indicated for varying airports and airport equipment conditions.

The pilot and/or co-pilot are required to visually and mentally digest and filter the non-relevant information out from that information that applies specifically to the operational situation at hand. For example, if the aircraft being flown is a category "C" aircraft, then the minima information pertaining to the category "A", "B" and "D" aircraft will not be needed by the pilot or co-pilot. As will be appreciated, this can significantly add to the cognitive workload of the pilot and/or co-pilot while the pilot and/or co-pilot are attempting to perform a flight maneuver, such as a landing approach, in the aircraft.

Even within digital Electronic Flight Bag (EFB) devices, the aeronautical approach charts do not allow real-time user interaction to filter information, to alter displayed data or to use real-time and current operational parameters to de-clutter approach charts automatically and dynamically. By "de-clutter", it is meant the operation of removing minima information that the pilot does not need, based on real-time weather conditions, real-time airport operational conditions, the specific aircraft being piloted, and various other factors. Alternatively, the "de-clutter" terminology can be thought of as the operation of "masking" certain minima information that the pilot and co-pilot do not need, so that certain information non-pertinent is not presented to the pilot and/or co-pilot. As a result, approach charts typically contain significantly more information than a flight crew requires for executing a landing approach under a certain condition (e.g., aircraft approach category). Even though some present day airlines have custom made paper charts for them that only indicate the aircraft category that is applicable for their flight rules, such charts typically still present information pertaining to a plurality of different airport and/or visibility conditions. Thus, such custom charts still require the pilot and/or co-pilot to cognitively filter out a relatively large amount of information that will not be pertinent to the specific airport and weather conditions that are present at the time an approach is being executed. This can significantly add to the cognitive workload imposed on the pilot and/or co-pilot.

SUMMARY

The present disclosure relates to a method and system for dynamically determining a condensed quantity of context sensitive information pertaining to a mobile platform operational procedure, in real time, from a larger quantity of available context sensitive information, and displaying the condensed quantity of context sensitive information to the mobile platform operator in real time.

In one particular implementation the method includes analyzing context sensitive data, in real time, relating to an operational procedure of an airborne mobile platform to be carried out by an individual operating the airborne mobile platform. A subset of context sensitive information is dynamically determined from a larger quantity of context sensitive information relating to the operational procedure. The subset of context sensitive information is then displayed to the individual operating the airborne mobile platform.

In one specific implementation the context sensitive information comprises minima information relating to a landing approach at a particular airport. The subset of context sensitive information relates to a subset of all the available minima information, and is tailored to only the specific operational and weather conditions present at a particular airport at a given time, as well as the specific type of aircraft and other factors pertaining to the approach. Thus, that portion of minima information that is not pertinent for enabling the pilot and/or co-pilot to execute the approach is filtered out to produce the subset of minima information. The subset of minima information is presented to the pilot and/co-pilot via a display system, in real time, which significantly reduces the cognitive workload of the pilot and/or co-pilot (i.e., particularly the individual who is actually flying the aircraft), and enables the pilot and/or co-pilot to more completely focus their attention on executing the landing approach.

In one specific implementation the subset of context sensitive information may be displayed in two or more different colors on the display to further visually signal to the pilot and/or co-pilot whether the context sensitive information (e.g., minima information) is near a minimum condition or is below a minimum condition.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. While the following description will reference a "mobile platform", and more specifically an airborne mobile platform such as an aircraft, it will be appreciated that the teachings herein are applicable to the navigation/operation of any type of vessel. For example, the teachings herein could be just as readily applied to operators of marine vessels or land vehicles, where the operator may be required to view a large quantity of context sensitive information and to cognitively process such information before (or while) performing a specific operational procedure. Accordingly, the reference to an "airborne mobile platform" or "aircraft" throughout the following discussion is merely meant to illustrate one potential application of the teachings of the present disclosure.

Figure 2:
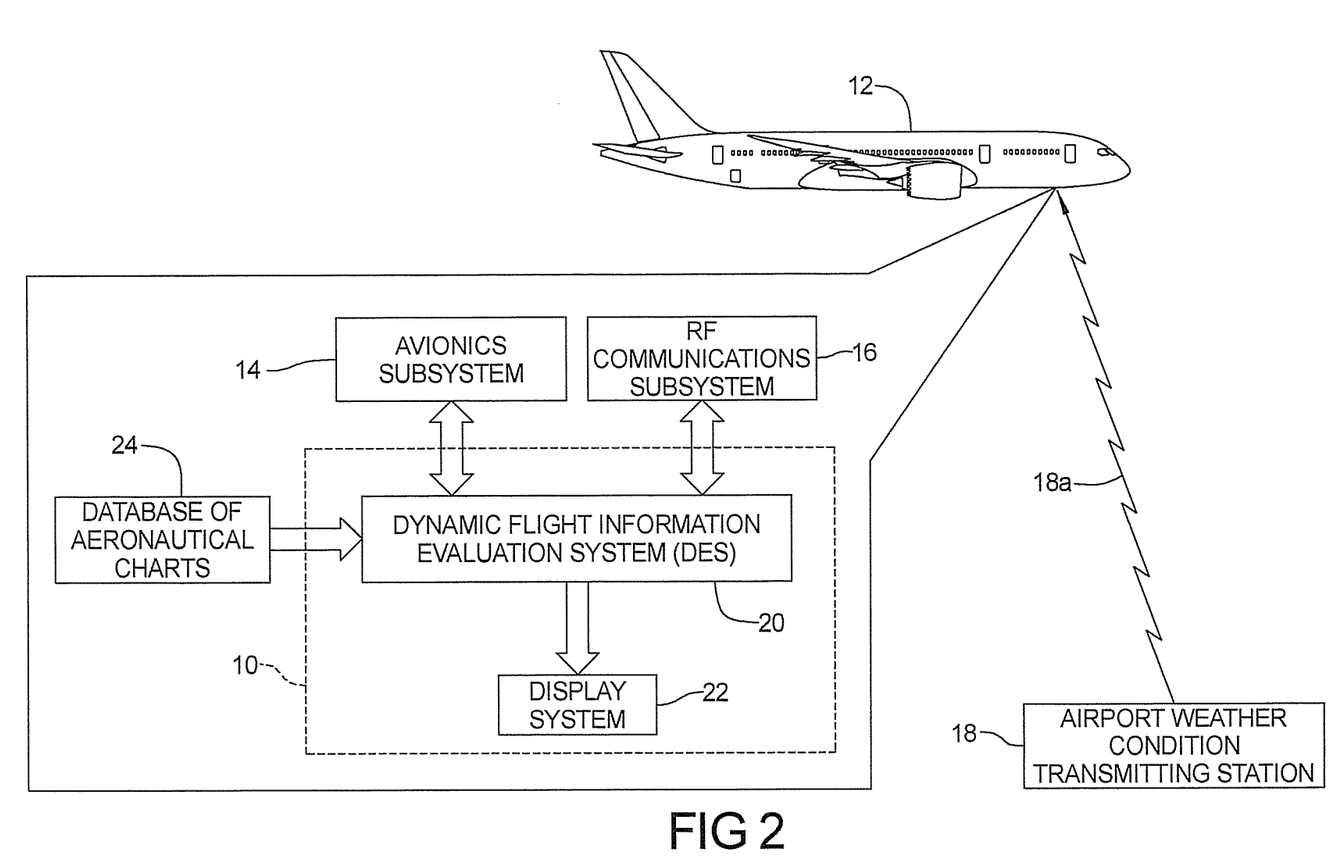
FIG. 2 is a block diagram of one embodiment of a system in accordance with the present disclosure.

Referring to FIG. 2, a system 10 in accordance with one embodiment of the present disclosure is shown. The system 10 is used, in this example, with a vessel that forms an airborne mobile platform. The airborne mobile platform is illustrated as an aircraft 12. The aircraft 12 has an avionics subsystem 14 for generating traditional information (e.g., altitude, airspeed, etc.) for use by other subsystems and for consideration of the flight crew. It is also possible for the system 10 to be employed at a fixed location to dynamically evaluate a large quantity of information or data and to selectively generate only a relevant sub-quantity of information or data that is needed by an individual, in real time, for accomplishing a specific operation or task. Thus, it will be appreciated that the system 10 may find significant utility outside of aerospace and aircraft applications.

Referring further to FIG. 2. The aircraft 12 may typically also include an RF (radio frequency) communications subsystem 16 for receiving information and data from an airport weather/condition information transmitting station 18 via RF signals 18a transmitted from the weather/condition information transmitting station. This information may be used by the pilot (i.e., operator) and/or co-pilot (collectively referred to as the "flight crew"), but in one example, to be explained in greater detail below, it may be input to the system 10 for use by the system in determining (or enhancing) information that is to be displayed.

The system 10 generally includes a dynamic flight information evaluation system 20 (hereinafter after the "DES" 20) and a display system 22. The display system 22 may form a pre-existing display component carried by the aircraft 12 that is used for displaying aeronautical navigation charts stored in a database 24, and particularly landing approach charts. The display system 22 may be directly interfaceable with the DES 20, but in some applications a suitable interface (not shown) may be required. The display system 22 preferably has a color display screen (e.g., either CRT or LCD) that is able to selectively display specific types of information in different colors to even further aid the flight crew in quickly visually assimilating and cognitively processing the information being presented.

Figure 4:
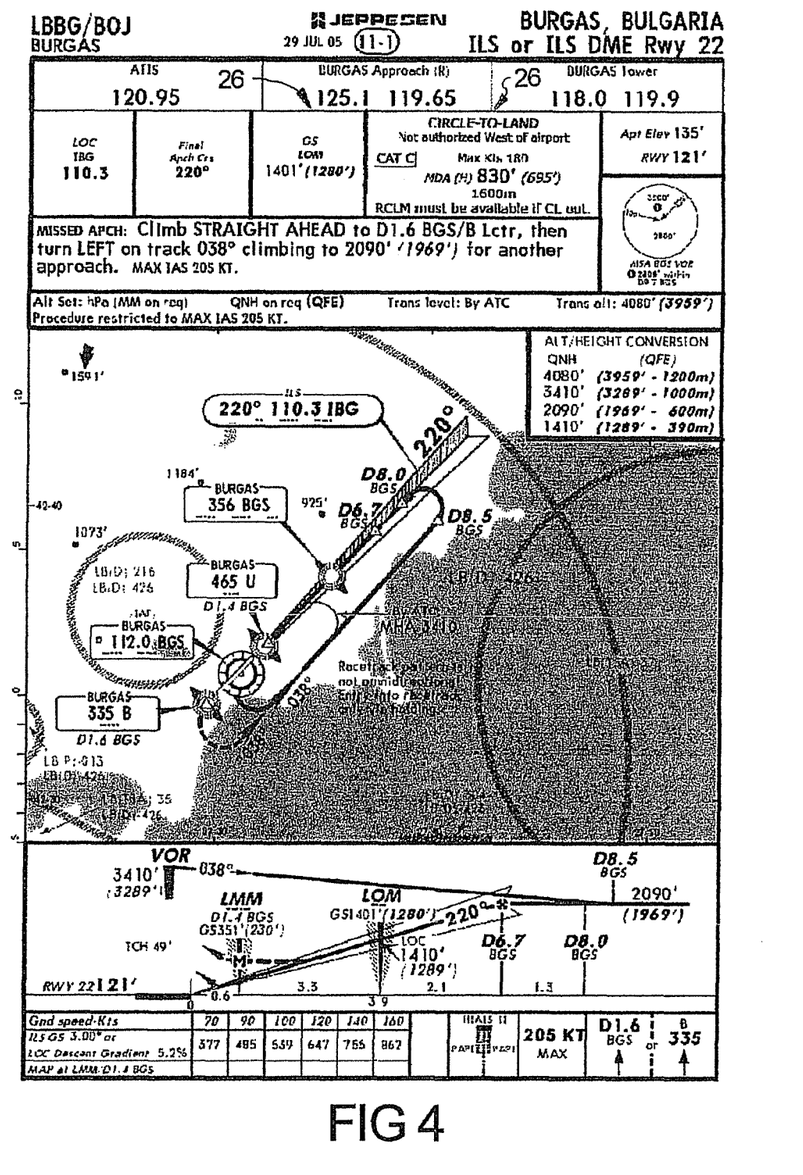
FIG. 4 is an example of an aircraft approach chart having condensed minima information, as may be generated by the present system and method.

In general operation, the DES 20 is loaded with information from the database 24 containing aeronautical information, for example, landing approach charts. Verbal information broadcast from the airport weather/condition information may be converted using any suitable voice recognition software to text information and also input to the DES 20. The DES 20 analyzes this information, together with information from the avionics subsystem 14 to dynamically evaluate what minimum sub-quantity of approach information is required by the flight crew piloting the aircraft 12. In effect, the DES 20 takes a large quantity of approach information (also termed "minima" information) and eliminates portions of the information that are not pertinent, and not required, for the flight crew to consider while executing a landing operation. For example, the approach chart for a given airport may provide several RVR distances for four different types of aircraft, as illustrated in FIG. 1, but if the aircraft 12 is a category "D" aircraft, then only the RVR distances pertaining to a category D aircraft will be pertinent for the flight crew to consider. Additionally, an operator may provide a configuration parameter that selects a given aircraft category as per their Operational Approval that is more restrictive than the minimum requirements (e.g. flying a category D aircraft but using Cat C minimums). Still further, if the Approach Lighting System (ALS) at the airport is working properly, then the RVR corresponding to the ALS "out" condition is irrelevant to the flight crew, and does not need to be displayed on the display 22. And still further yet, if the ALS is operating properly, and a localizer (LOC) is operational at the airport, then a different RVR distance is applicable. Accordingly, it will be appreciated that the DES 20 is able to determine exactly that specific sub-quantity of context sensitive information (i.e., a sub-quantity of minima of the overall available minima) that needs to be presented to the flight crew based on various specific conditions existing at the time an approach is being executed. Such conditions typically will include, without limitation, the specific airport at which the aircraft is landing, the specific aircraft being flown, the specific approach selected or assigned, and whether various lighting and approach systems are available and operational at the airport. The DES 20 may also include, as part of the context sensitive sub-quantity of information selected for display, and without limitation, information originating from the airport weather/condition transmitting station 18. An example of an approach chart that may be displayed on the display system 22 is shown in FIG. 4. In this example the condensed minima is presented at the upper middle area of the chart and denoted by reference numeral 26.

Importantly, the DES 20 determines dynamically, in real time, that specific sub-quantity of pertinent context sensitive information (i.e., pertinent minima) and displays the sub-quantity of information to the flight crew via the display system 22. This significantly reduces the cognitive workload of the flight crew by significantly reducing the amount of available context sensitive information (i.e., minima) that needs to be visually and cognitively processed by the flight crew while executing a landing approach operation. This frees the flight crew to concentrate their attention more fully on executing the landing approach.

Figure 3:
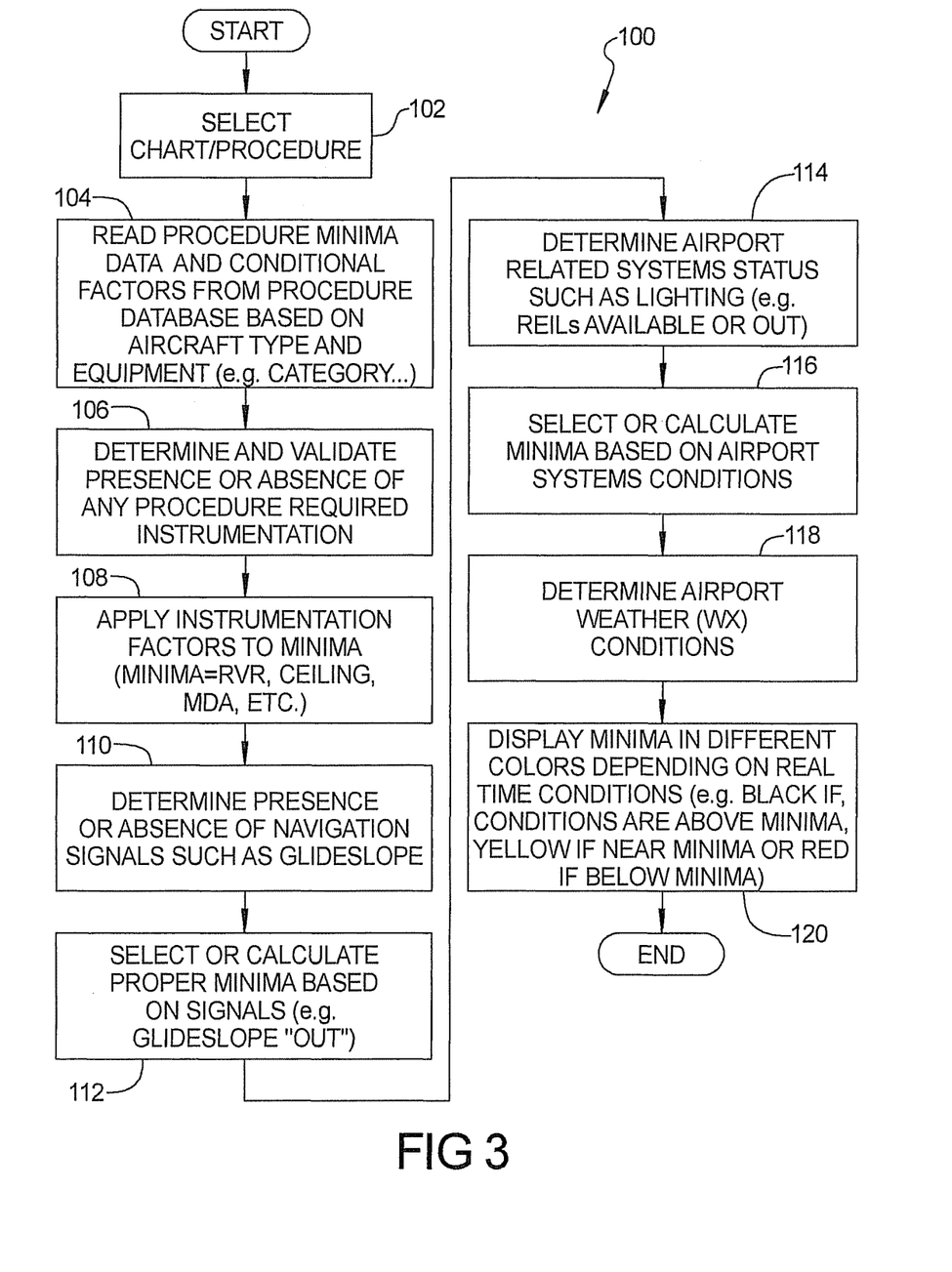
FIG. 3 is a flow diagram of operations performed in accordance with one exemplary implementation of the present disclosure.

Referring to FIG. 3, a more detailed presentation of various operations that may be performed by one implementation of the system 10 is shown in flowchart 100. At operation 102, a particular navigation chart (e.g., an approach chart) may be selected manually by a flight crew member. Alternatively, the selection may be selected automatically by the system 10 based on a particular flight plan and location.

At operation 104, procedure minima data is obtained from the database 24 (FIG. 1) along with any conditional factors that may pertain to the particular flight operation about to be performed. At operation 106, the presence or absence of any procedure required instrumentation is determined and validated. At operation 108, any applicable instrumentation factors are applied to the minima such as the present RVR distance, the minimum descent altitude (MDA) and the Ceiling (altitude at which any cloud cover begins). At operation 110, the system 10 determines the presence or absence of navigation signals such as the Glideslope (GS). The navigation head present on the aircraft may or may not detect a Glideslope. Different RVR values will apply depending if the Glideslope is operational or not.

At operation 112, the appropriate minima is determined based on which one of the GS "OK" or "out" conditions is present. At this point, the DES 20 may encode the minima data so that it is presented in a particular color on the DES 20. For example, the RVR distance information may be displayed in yellow, red or another color if the GS "out" condition is present. This further visually alerts the flight crew to an important condition existing while the approach is being performed.

At operation 114, airport facility conditions are determined either via a data subchannel of the airport weather/condition transmitting station 18 (typically termed the Automatic Terminal Information Service (ATIS), or via a digital ATIS). Alternatively, information may be entered into the DES 20 by a pilot or co-pilot after listening to an audio transmission received from the airport weather/condition transmitting station 18.

At operation 116, the minima values based on lighting values present at the time the approach is being executed are either calculated or looked up from a suitable table carried in the database 24 (FIG. 1). At operation 118, weather conditions (e.g., RVR, Ceiling, etc.) are determined either via a data subchannel of the airport weather/information transmitting station or entered by a pilot after listening to an audio transmission from the airport weather/condition transmitting station 18.

At operation 120, the minima is displayed (i.e., RVR and Ceiling or MDA/DH (Minimum Descent Altitude/Decision Height)) based on the determinations made in the foregoing operations. Optionally, the minima may be displayed on the display system 22 in black if actual conditions (i.e., RVR, Ceiling) are greater than the minima, in yellow if the actual conditions are near the minima, or in red if actual conditions are below the minima. Other colors or coloring schemes are also possible.

From the foregoing example of a landing approach, it will also be appreciated that certain other factors such as airport weather (WX), Instrument or GS function must be monitored and factored into values during the entire approach procedure. It is preferable that a warning or notification should be shown on the display system 22 if the determined minima should change after the inbound approach procedure has started. Also, it will be appreciated that some changes that occur after the IAF (initial approach fix) has been crossed will cause a display change while other conditions would not change once the approach has started. Also, it will be appreciated that the pilot and/or co-pilot may need to revert to the prior display or be able to fix the display to not change after a certain point in flying the approach.

From the foregoing it will be appreciated that the system 10 and method of the present disclosure significantly reduces the cognitive workload required by flight crew members while executing an approach. The system 10 dynamically determines only that sub-quantity of available minima data that needs to be displayed to the flight crew under a given set of operational and weather conditions existing at the time an approach is being executed, and displays the condensed minima, in real time, on the display system 22. Since the system 10 operates dynamically and in real time, various context sensitive conditions and/or data existing at the time an approach is being executed can be evaluated, in real time, and the subset of minima that is generated by the system 10 will be tailored to the precise airport, weather and various other conditions and/or data existing at the time. It will also be appreciated that the teachings of the present disclosure could be readily adapted to other scenarios where it would be helpful to dynamically evaluate and reduce the amount of visual information provided to an individual (or individuals), in real time, who is/are attempting to perform an operation requiring significant concentration and attention.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for determining a condensed quantity of context sensitive information pertaining to a specific category of vessel, selected by an individual operating a vessel that falls within the specific category of vessel, from a larger quantity of available information related to additional categories of vessels different from the specific category of vessel, for use by the individual in operating the vessel, the method including:

using a non-transitory computer readable medium running on a processor to perform a plurality of operations including:

analyzing context sensitive data, in real time, relating to:

an operational procedure of said specific category of vessel to be carried out by the individual operating said vessel, and a real time environmental condition existing at a time and at a location that the operational procedure needs to be performed; and status information supplied from the location relating to a real time status of a lighting subsystem present at the location;

dynamically determining in real time a subset of context sensitive information suitable for use with said specific category of vessel, in view of said real time environmental condition at said location and said real time status information obtained from said location relating to availability or non-availability of the lighting subsystem, the subset of context sensitive information taken from a larger quantity of context sensitive information relating to said operational procedure as applied to said additional categories of vessels; and presenting only said subset of context sensitive information to said individual operating the vessel to reduce a quantity of information that is visually presented to the individual on a visual display device while operating said vessel.

2. The method of claim 1, wherein said specific category of vessel comprises a class of aircraft.

3. The method of claim 2, wherein said context sensitive data relates to minima data presented as part of a landing approach chart for said aircraft, and wherein said operational procedure relates to a landing approach for said aircraft.

4. The method of claim 3, wherein said subset of context sensitive information comprises at least one of:

environmental information at said airport;

a real time value for runway visual range (RVR) at said airport;

real time visibility information at said airport; and a minimum safe altitude (MSA) value;

a glide slope indication for said landing approach; and missed approach information.

5. The method of claim 1, wherein presenting, only said subset of context sensitive information comprises presenting only said subset of context sensitive information on said visual display device.

6. The method of claim 5, wherein presenting only said subset of context sensitive information on said visual display device comprises presenting a portion of said subset of context sensitive information in a color that differs from a remainder of said subset of context sensitive information being displayed on said visual display device.

7. The method of claim 1, wherein status information comprises context sensitive information received by radio frequency communications from the location.

8. The method of claim 7, wherein said context sensitive information received by said radio frequency communications comprises information from the lighting subsystem broadcast from an Automatic Terminal Information Service, the information relating to an Approach Lighting System (ALS) and a real time Runway Visual Range (RVR) value, that is encoded into textual information prior to being transmitted to said vessel.

9. A method for dynamically evaluating aircraft landing approach information and generating a subset of context sensitive information for a specific category of aircraft selected by a pilot of the aircraft from a larger set of information that includes information relating to categories of aircraft different from the specific category of aircraft, in real time that eliminates unnecessary aircraft approach information, the method comprising:

using a non-transitory computer readable medium running on a processor to perform a plurality of operations including:

dynamically evaluating a first quantity of information pertaining to a landing approach at a specific airport and determining a first sub-quantity of information that is not necessary for a pilot to consider when making said landing approach, based upon:

the specific category of aircraft selected by the pilot, a real time environmental condition existing at said airport while said landing approach needs to be performed; and real time status information supplied from the airport regarding an available or non-available status of a lighting subsystem at said airport;

dynamically removing said first sub-quantity of information from said first quantity of information to produce a second sub-quantity of information, said second sub-quantity of information including information required by said pilot, based upon the specific category of aircraft selected by the pilot, by the real time environmental condition existing at said airport~and the real time available or non-available status information relating to the lighting subsystem, to perform said landing approach; and presenting said second sub-quantity of information to said pilot on a visual display device of an aircraft being operated by the pilot that falls within the specific category of aircraft and takes into consideration said environmental condition existing at said airport and said available or non-available status information relating to the lighting subsystem, in real time, while said pilot is about to execute said landing approach at said airport, to thus reduce a quantity of information that is visually presented to said pilot on said visual display device while said pilot is operating said aircraft.

10. The method of claim 9, wherein said first quantity of information relates to minima information, and said second sub-quantity of information relates only to a sub-quantity of said minima information that is relevant to enabling said pilot to execute said landing approach with consideration of said real time environmental condition.

11. The method of claim 10, wherein said sub-quantity of minima information further comprises at least one of:

a real time value for runway visual range (RVR) at said airport;

real time visibility information (VIS) at said airport; and a minimum safe altitude (MSA) value;

a glide slope for said landing approach; and missed approach information.

12. The method of claim 9, wherein presenting only said second sub-quantity of information on a visual display device comprises presenting a portion of said second sub-quantity of information on said visual display device in a color that differs from a remainder of said second sub-quantity of information being display on said visual display device.

13. The method of claim 9, wherein dynamically evaluating said first quantity of information comprises analyzing context sensitive minima information received by radio frequency communications at said aircraft from said airport.

14. The method of claim 9, wherein said first quantity of information is received by radio frequency communications at said aircraft:

wherein the real time status information comprises real time status information broadcast from the communications subsystem, where the real time status information comprises an Automatic Terminal Information Service (ATIS), and where wherein the lighting subsystem includes an Approach Lighting System (ALS), and a real time Runway Visual Range (RVR) value, that is encoded into textual information and displayed on said visual display device as part of said second subquantity of information, in real time.

15. A method for determining a condensed quantity of information pertaining to operation of an aircraft, the method comprising:

using a non-transitory computer readable medium running on a processor to perform a plurality of operations including:

providing a quantity of information relating to operational procedures for different types of aircraft and a real time environmental condition existing at a time that an operational procedure for said aircraft needs to be performed by a pilot of said aircraft at a specific location;

responding to selections by a pilot of the aircraft that selects a specific category of aircraft from a plurality of different categories of aircraft, and a specific operational procedure based on said real time environmental condition existing at said location and a real time available or non-available status of a lighting subsystem at the location as reported to the aircraft by the location;

analyzing the quantity of information and determining, in real! time, a subquantity of pertinent information therefrom, that is relevant only to operational procedures of the specific category of aircraft selected by the pilot, for the location at which an aircraft operational procedure is to be performed, and for:

a specific real time environmental condition existing at the location during which the aircraft operational procedure is to be performed; and the real time available or non-available status of the lighting subsystem at the location;
presenting only information relating to said subquantity of pertinent information to the pilot on a visual display device carried in a cockpit within the aircraft; and
wherein the subquantity of pertinent information includes a plurality of:
a real time value for runway visual range (RVR) at said airport;
a real time visibility information at said airport;
a minimum safe altitude (MSA) value; and
a glide slope indication for said landing approach; and
the method reducing an overall quantity of information that is visually presented to the pilot on said visual display device while said pilot is operating said aircraft.

* * * * *

UNITED STATES PATENT AND TRADEMARK OFFICE
CERTIFICATE OF CORRECTION

PATENT NO. : 8,798,818 B2
APPLICATION NO. : 11/868812
DATED : August 5, 2014
INVENTOR(S) : Wiesemann et al.

Page 1 of 1

It is certified that error appears in the above-identified patent and that said Letters Patent is hereby corrected as shown below:

In the Claims:

Column 7, Claim 9, Line 56, please delete "~" and insert --,-- therefor;

Column 8, Claim 15, Line 60, please delete "real !" and insert --real-- therefor.

Signed and Sealed this
Eleventh Day of November, 2014

Michelle K. Lee
*Deputy Director of the United States Patent and Trademark Office*